C. A. BAILEY.
COVERED TABLE-WARE.
No. 171,910. Patented Jan. 11, 1876.
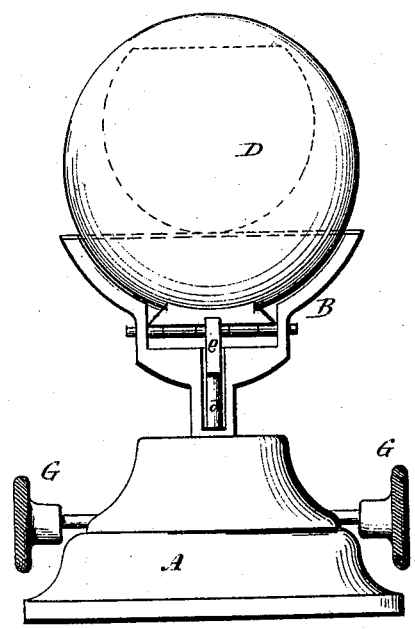
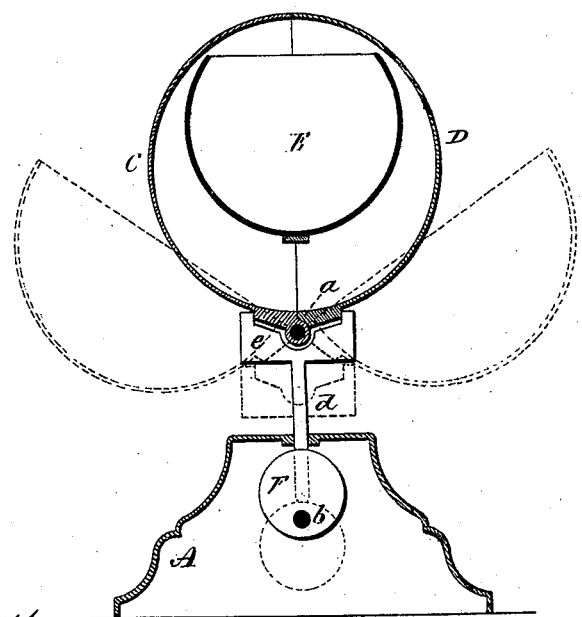

UNITED STATES PATENT OFFICE.

CHARLES A. BAILEY, OF COBALT, CONNECTICUT.

IMPROVEMENT IN COVERED TABLE-WARE.

Specification forming part of Letters Patent No. 171,910, dated January 11, 1876; application filed December 9, 1875.

*To all whom it may concern:*

Be it known that I, CHARLES A. BAILEY, of Cobalt, in the county of Middlesex and State of Connecticut, have invented a new Improvement in Covered Table-Ware; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, vertical central section on line $x\,x$.

This invention relates to an improvement in that class of table-ware which is usually provided with a removable cover, such as butter-dishes, sugar-bowls, and the like, the object being to provide the dish with the mechanism for opening and closing the cover; and it consists in a divided spherical or other conveniently-shaped cover, hinged together below, and so as to inclose the dish, all as more fully hereinafter described.

A is the base, which may be of any desirable form, and on which is a standard, B. In this standard the two parts C D of the cover are hinged, as at $a$, and so as to be closed together or turned from each other, the division being centrally vertical. The standard B is continued up with the two covers, and so as to support the dish E—this dish formed so as to stand within and be closed by the covers, as indicated in Fig. 2. Within the base is an eccentric or cam, F, arranged upon a shaft, $b$, the shaft extending through one or both sides of the base, and provided with a knob, G, or other convenience for turning the shaft. Resting on this cam is a vertical rod or follower, $d$, constructed with a cross-head, $e$, this cross-head bearing upon the two parts of the cover outside of the hinge-joint; hence, as the cross-head is dropped, the covers will fall, respectively, to the right and left, as indicated in broken lines, and when the cross-head is raised the covers will be accordingly closed. The cam F is constructed so that by turning the shaft $b$ the cross-head will be lowered or raised accordingly, and so as to open or close the covers, as the case may be. The shape of the dish or of the covers is immaterial, it only being essential that the two parts of the cover be hinged together beneath, and so as to expose or close the dish, as the case may be.

I claim—

The vertically-divided cover C D and the dish E upon a common pedestal, the two parts of the cover hinged beneath, and so as to inclose or expose the dish, as the case may be, combined with the cross-head, operated vertically, substantially as described, to open and close said cover, substantially as specified.

CHAS. A. BAILEY.

Witnesses:
   MARIA ACKLEY,
   JOSIAH ACKLEY.